United States Patent [19]

Okura et al.

[11] Patent Number: 5,713,718

[45] Date of Patent: Feb. 3, 1998

[54] OBJECT PICKING DEVICE

[75] Inventors: Ryoichi Okura; Yutaka Saeki, both of Kakogawa, Japan

[73] Assignee: Okura Yusoki Kabushiki Kaisha, Kakogawa, Japan

[21] Appl. No.: 699,627

[22] Filed: Aug. 19, 1996

[51] Int. Cl.$^6$ .................................................. B65G 59/06
[52] U.S. Cl. ........................ 414/797.9; 271/10.02; 271/10.06; 271/35; 271/270; 271/271; 414/797.5; 414/797.6
[58] Field of Search ..................... 414/797.5, 797.6, 414/797.9; 271/10.02, 10.06, 35, 270, 271

[56] References Cited

U.S. PATENT DOCUMENTS

| | | | |
|---|---|---|---|
| 2,597,415 | 5/1952 | Watson | 414/797.6 X |
| 4,232,859 | 11/1980 | Tokuno | 414/797.6 X |
| 5,271,703 | 12/1993 | Lindqvist et al. | 414/797.9 X |
| 5,476,191 | 12/1995 | Dunford et al. | 414/797.6 X |

*Primary Examiner*—Janice L. Krizek
*Attorney, Agent, or Firm*—Morrison Law Firm

[57] ABSTRACT

An object discharge mechanism of an object picking device for discharging a bottommost object from a stack of objects includes a bottom platform on which the bottommost object of the stack of objects rests. The platform has a longitudinal slot running along an object discharge direction. The upper portion of a belt, stretched between two vertically mounted pulleys, runs through the longitudinal slot parallel to the upper surface of the bottom platform. Discharge projections are mounted periodically on an outer surface of the belt. The discharge projections push objects across the bottom platform in the object discharge direction when the belt is rotated. The object discharge mechanism also includes a lifting member for lifting all objects above the bottommost object in the stack of objects. The lifting member reduces the frictional force created by the weight of the stack of objects on the bottommost object during discharge of the bottommost object. A controller controls the speed at which the discharge projections travel during the discharge process. Specifically, the speed at which the discharge projections contact the objects to be discharged is dependent on the fragility of the object to be discharged such that the discharge projection moves slowly when contacting objects that are fragile and moves at a maximum speed when contacting objects that are not easy to break.

30 Claims, 8 Drawing Sheets

OBJECT PICKING DEVICE

BACKGROUND OF INVENTION

The present invention relates to an object picking device for discharging selected objects contained in object storage sections onto a conveyor of the object picking device for loading an assortment of those objects into a container.

Conventional picking systems include a plurality of object storage sections. Each object storage section houses a stack of objects. Each object storage section also includes a discharge mechanism for discharging one of the objects from the stack of objects. Each object storage section includes a discharge port at a lower end thereof. The discharge port is sized to allow only the bottommost object in the stack to pass through. The discharge mechanism discharges the bottommost object through the discharge port.

Conventional discharge mechanisms are typically of a reciprocating motion type. An example of such a mechanism includes a discharging piece which projects above and retracts below the load receiving platforms. The standard position of the discharging piece is at the end of the load receiving platform opposite the discharge port. The discharging piece projects above the load receiving platforms and pushes the bottommost object towards the discharge port to discharge an object. During the return phase, the discharging piece retracts below the load receiving platform and is transported back to the standard position.

The conventional discharge mechanisms are incapable of retrieving objects successively at a high speed. A period of time is required between each cycle of discharging an object for each discharge piece to return to its standard position.

In conventional discharge mechanisms an erroneous retrieval often occurs. The discharge ports of the conventional system described above are always open. Furthermore, the load receiving platforms of conventional discharge mechanisms are normally inclined downward to facilitate the complete discharge of objects from the object storage section. The erroneous retrieval occurs because an object, especially if it is the last one contained in an object storage section, tends to slide down on the load receiving platforms due to its own weight and slip out of the discharge port, before the discharge mechanism pushes it out.

In conventional discharge mechanisms, the discharge piece moves quickly to increase the efficiency of the object picking device. However, the faster the discharge piece moves the more easily fragile objects are damaged by the impact between the discharge piece and the object.

SUMMARY OF THE INVENTION

It is an object of the present invention to provide an object picking device that overcomes the drawbacks of the prior art.

It is an object of the present invention to provide an object picking device which retrieves objects successively at a high speed.

It is also an object of the present invention to provide an object picking device which prevents objects from accidentally slipping out of discharge ports, thereby preventing erroneous retrieval.

It is also an object of the present invention to provide an object picking device which limits the damage incurred by objects during discharge.

Briefly stated, an object discharge mechanism of an object picking system for discharging a bottommost object from a stack of objects includes a bottom platform on which the bottommost object of the stack of objects rests. The platform has a longitudinal slot running along the object discharge direction. The upper portion of a belt, stretched between two vertically mounted pulleys, runs through the longitudinal slot parallel to the upper surface of the bottom platform. Discharge projections are mounted periodically on an outer surface of the belt. The discharge projections push objects across the bottom platform in the object discharge direction when the belt is rotated. The object discharge mechanism also includes a lifting member for lifting all objects above the bottommost object in the stack of objects. The lifting member reduces the frictional force created by the weight of the stack of objects on the bottommost object during discharge of the bottommost object. A controller controls the speed at which the discharge projections travel during the discharge process. Specifically, the speed at which the discharge projections contact the objects to be discharged is dependent on the fragility of the object to be discharged such that the discharge projection moves slowly when contacting objects that are fragile and moves at a maximum speed when contacting objects that are not easy to break.

According to an embodiment of the present invention, an object discharge device effective for discharging a bottommost object from a stack of objects, includes a bottom platform on which the bottommost object of the stack of objects rests, a discharge port at an end of the bottom platform, means for pushing the bottommost object across the bottom platform through the discharge port from a first position at a bottom of the stack to a second position at least partially outside the object discharge device, the means for pushing including a means for adjusting the speed of the pushing dependent upon a predetermined fragility of the objects, an object lifter movably mounted at a lower rear portion of the object discharge device, at an end of the bottom platform opposite the discharge port, the object lifter movable between a retracted position, whereat the object lifter does not contact any of the objects, and an advanced position whereat the object lifter supports a next bottommost object and means for moving the object lifter between the retracted position and the advanced position.

According to another embodiment of the present invention, an object picking device effective for storing a plurality of stacks of objects and discharging a bottommost object of each of the plurality of stacks of objects onto an object conveyor, comprising a plurality of object discharge devices, each of the plurality of object discharge devices further including a bottom platform on which the bottommost object of the each of the plurality of stacks of objects rests, the bottom platform having a longitudinal slot, a discharge port at an end of the bottom platform, means for pushing the one of the bottommost objects along the bottom platform through the discharge port from a first position at a bottom of the one of the stacks to a second position at least partially outside the one of the object discharge device, the means for pushing including means for adjusting a speed of the pushing dependent on a predetermined fragility of the objects, an object lifter movably mounted at a lower rear portion of the each one of the plurality of object discharge devices on an opposite end of the bottom platform from the discharge port, the object lifter movable between a retracted position, whereat the object lifter does not contact any of the objects, and an advanced position whereat the object lifter supports a next bottommost object of the each of the plurality of stacks of objects and means for moving the object lifter between the retracted position and the advanced position.

A device according to the present invention includes object storage sections in which a plurality of objects stacked one upon another are contained. Each object storage section includes a discharge port at a lower part thereof which allows only the bottommost object to pass therethrough. Discharge mechanisms push objects through the discharge ports. Each discharge mechanism includes load receiving platforms for supporting the underside of the bottommost object contained in the corresponding object storage section.

Each discharge mechanism includes a belt which is reeved around at least a pair of pulleys. A parallel traveling area is the portion of the belt which travels in parallel to an upper surface of the load receiving platforms, in the direction in which objects are discharged. The belt also includes a plurality of discharge projections attached at regular intervals to an outer surface of the belt. The discharge projections project above the load receiving platforms in the parallel traveling area.

The discharge mechanisms also include a motor for rotating the belt. A detection means detects the degree of rotational movement of the motor. A control means controls the motor responsive to the detection means, thereby rotating the belt relative to a position inside the discharge port serving as the standard position for each discharge projection.

According to the present invention, by means of continuously rotating the endless members, objects contained in the object storage sections are successively retrieved at a high speed by means of a plurality of discharge projections provided on the endless members. As a discharge projection which has just completed a discharge stops at its standard position in its discharge port, objects are prevented from accidentally spilling out of the discharge port even though the load receiving platforms are inclined downward, in the direction where the objects are discharged.

The above, and other objects, features and advantages of the present invention will become apparent from the following description read in conjunction with the accompanying drawings, in which like reference numerals designate the same element.

DETAILED DESCRIPTION OF PREFERRED EMBODIMENTS

Figure 1:
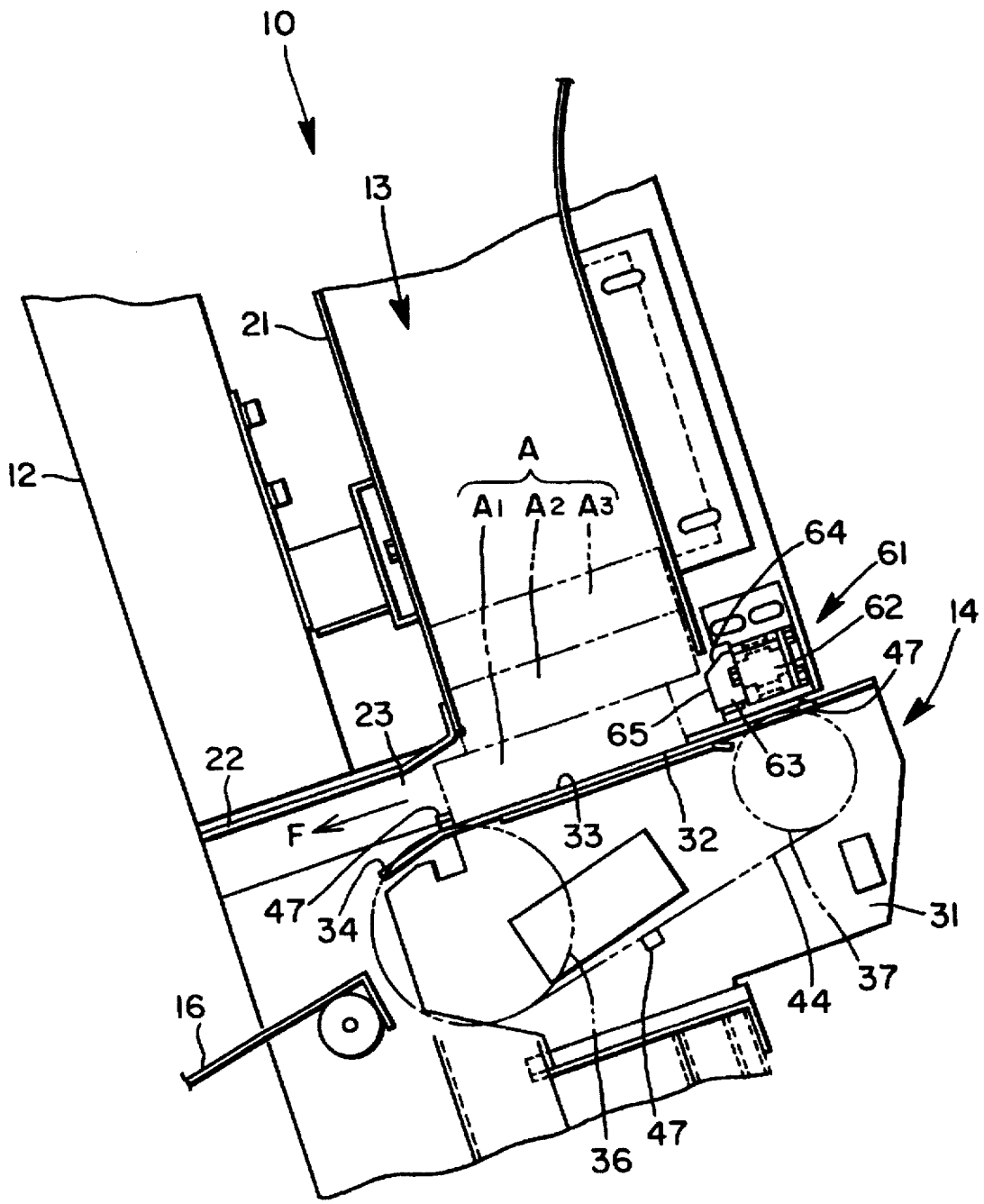
FIG. 1 is a side view of an object storage/discharge unit of an object picking system according to an embodiment of the present invention.

Referring to FIG. 1, an object storage/discharge unit 10 includes a plurality of object storage sections 13 and discharge units 14. Object storage section 13 has a storage frame 21 which is attached to a main frame 12. Storage frame 21 contains a plurality of objects A, stacked one upon another.

A bottom of object storage section 13 is bounded by a pair of load receiving platforms 32 (only one load receiving platform is visible in FIG. 1). A supporting surface 33 of load receiving platforms 32 supports a bottommost object $A_1$. A guide member 22 is attached to a front portion of storage frame 21. A discharge port 23 at the forward end of load receiving platform 32 is formed between supporting surface 33 of load receiving platforms 32 and guide member 22. Discharge port 23 permits only bottommost object $A_1$ to pass through it at one time. A chute 16, attached to the front end of discharge unit 14, receives the discharged objects A. Storage frame 21 is mounted in a position on main frame 12 inclined toward discharge port 23.

A lifting means 61 is mounted at the rear end of the bottom of object storage section 13, opposite discharge port 23. Lifting means 61 includes an air cylinder 62 that serves as an actuator. A lifting member 63 is connected to air cylinder 62. Lifting member 63 is advanced or retracted by operation of air cylinder 62.

Lifting member 63 includes a horizontal pushing surface 65 for pushing bottommost object $A_1$ in discharge direction F when lifting member 63 advances. Lifting member 63 also includes an inclined lifting surface 64 which contacts a rear bottom edge of a next bottommost object $A_2$, thereby lifting next bottommost object $A_2$ upward as lifting member 63 is advanced. Lifting means 61 separates the bottommost object $A_1$ from the remainder of the stack by lifting object $A_2$ and all other objects A that are positioned above bottommost object $A_1$ upward when lifting member 63 advances.

Discharge unit 14 includes a vertically mounted frame board 31. The pair of load receiving platforms 32, in the shape of narrow plates, extend in discharge direction F. Load receiving platforms 32 are connected to a top of vertically mounted frame board 31. The upper surface of each load receiving platform 32 is a supporting surface 33 for receiving the underside of bottommost object $A_1$. A chute surface 34, inclined downward toward chute 16, is formed at the forward end of each supporting surface 33.

A large timing pulley 36 with a large diameter and a small timing pulley 37 with a smaller diameter are mounted at one side of frame board 31. Large timing pulley 36 and small timing pulley 37 are located at the downstream side and the upstream side, respectively, with respect to discharge direction F.

A timing belt 44 is reeved about large timing pulley 36 and small timing pulley 37. Timing belt 44 includes three discharge projections 47 at regular intervals on an outer surface of timing belt 44. Each discharge projection 47 is a square shape having a same width as that of timing belt 44 and a height sufficient to push bottommost object $A_1$ along discharge direction F when projected above load receiving platforms 32. Instead of a pulley and belt system, a wheel and chain system is considered to be within the scope of this invention.

Instead of a pulley and belt system, a wheel and chain system, cable system, or similar structure is also considered to be within the scope of this invention.

Figure 2:
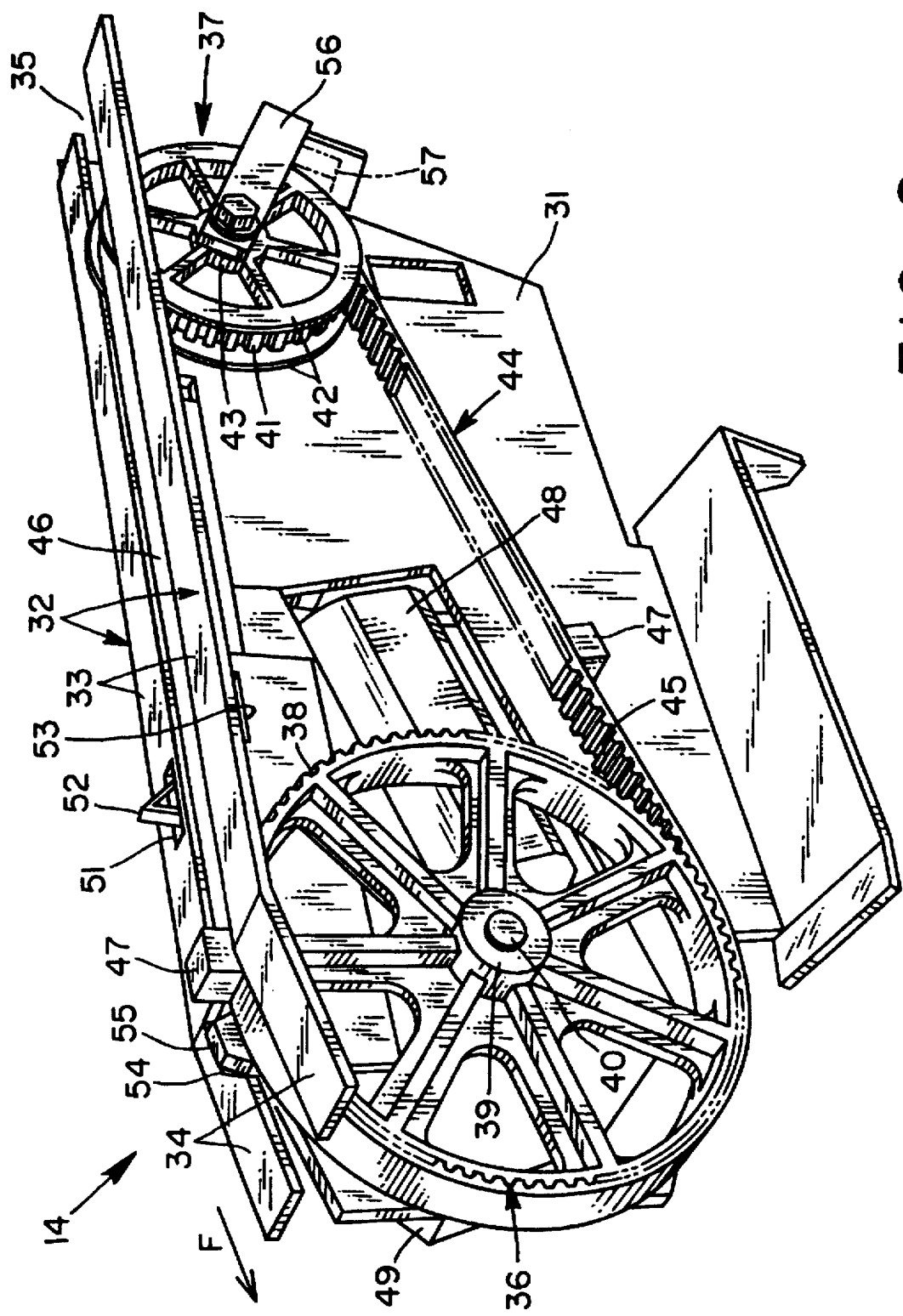
FIG. 2 is a perspective view of a discharge mechanism of the object/storage mechanism of FIG. 1.

Referring to FIG. 2, a slot 35 extends in discharge direction F between load receiving platforms 32. Large timing pulley 36 has a toothed gear portion 38 formed along an outermost circumferential surface thereof. A hub 39 at a center of timing pulley 36 is connected to a driving shaft 40 that extends into frame board 31. A rotating axis of driving shaft 40 is substantially horizontal. The upper part of large timing pulley 36 faces an underside of slot 35 (a plane extending from the underside of the load receiving platforms 32) in close vicinity thereto.

Small timing pulley 37 includes a toothed gear portion 41 along an outermost circumferential surface thereof. Small timing pulley 37 further includes first and second collar portions 42 forming opposed side walls of toothed gear portion 41. Small pulley 37 includes a hub 43 at a center thereof. Hub 43 rotatably supports small pulley 37 via a horizontal supporting shaft that is supported by frame board 31. An upper end of small pulley 37 projects through slot 35.

A gear portion 45, on an inner surface of timing belt 44, engages toothed gear portions 38 and 41 of large and small timing pulleys 36 and 37, respectively. A top run 46 of timing belt 44 stretches between the upper parts of large and small timing pulleys 36 and 37. Top run 46 fits in slot 35 to travel parallel to supporting surface 33.

A motor 48 and a gear mechanism 49 are mounted on the side of frame board 31 opposite large timing pulley 36. Gear mechanism 49 transmits the rotational driving force of motor 48 to driving shaft 40.

Supporting surface 33 includes a hole 51 in one of load receiving platforms 32. A detection piece 52 projects above and retracts into hole 51. Detection piece 52 retracts into hole 51 when pushed down by object A on supporting surface 33. Detection piece 52 projects above supporting surface 33 in the absence of object A on supporting surface 33. An emptiness detection sensor 53, below cutout hole 51, detects the presence of an object by depression of detection piece 52 below load receiving platform 32. When detection piece 52 projects above load receiving platform 32, emptiness detection sensor 53 detects the absence of an object. This may be interpreted as an indication that object storage section 13 is empty.

Chute surface 34 includes a cutout portion 54 which houses a discharge detection sensor 55. Discharge detection sensor 55 optically detects the discharge of an object A from discharge unit 14.

A discharge projection sensor 57, mounted on a bracket 56, attached to the supporting shaft of timing pulley 37, optically detects the passing of one of discharge projections 47 of timing belt 44.

Figure 3:
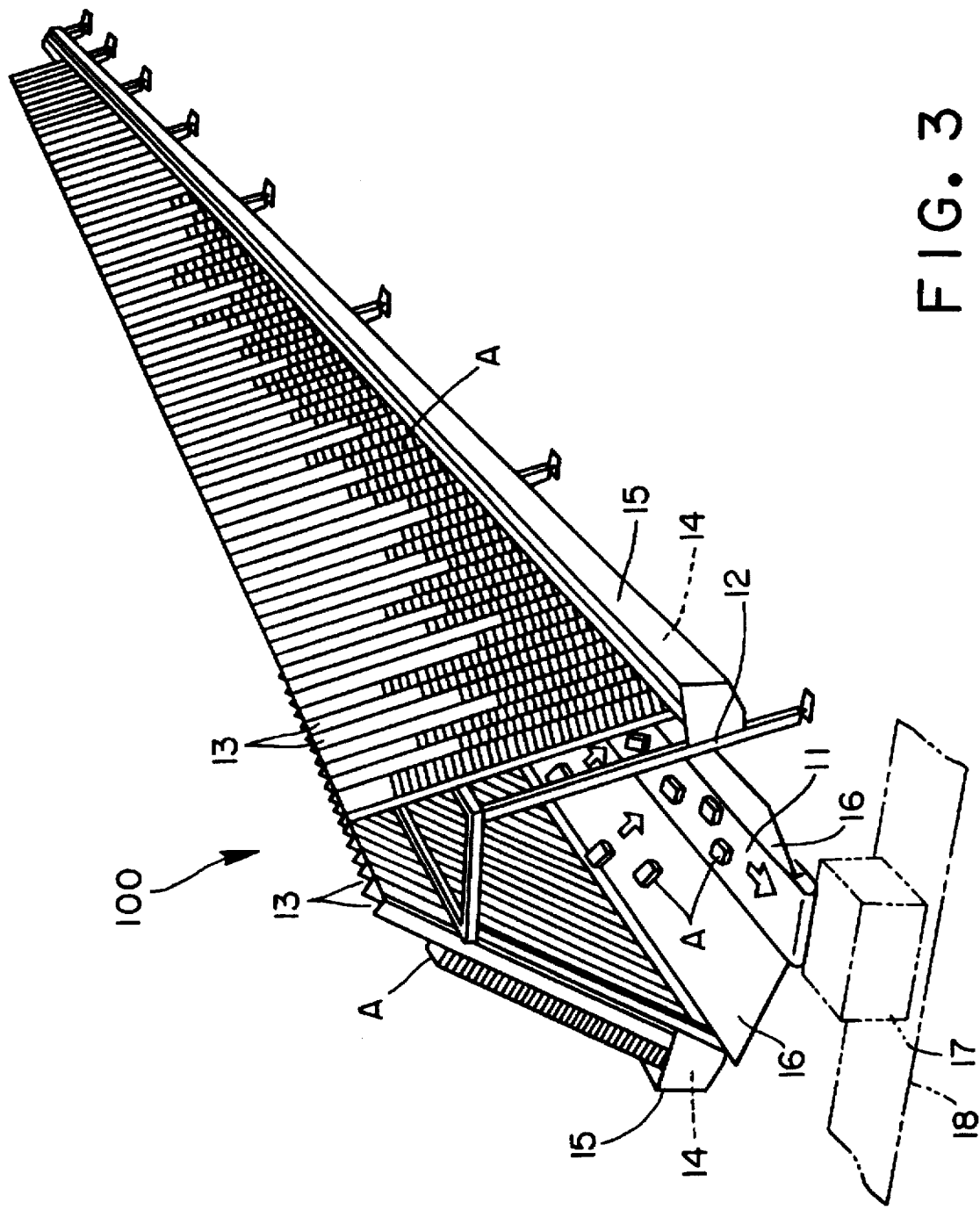
FIG. 3 is a perspective view of the object picking system of FIG. 1.

Referring to FIG. 3 an object picking system 100 includes an object conveyor 11. An essentially A-shaped main frame 12 straddles object conveyor 11. A plurality of object storage/discharge units 10, as previously described, are mounted along the sides of main frame 12. Each object storage/discharge unit 10 houses a stack containing a plurality of objects A. Objects A are sorted in groups according to their types and stacked one upon another in separate object storage/discharge units 10 along main frame 12. Discharge units 14 are covered by covers 15. Discharge units 14 discharge the bottommost object A from among the objects contained in an object storage section 13 of each object storage/discharge unit 10. Chute 16 directs discharged objects A onto object conveyor 11. Chute 16 is mounted between each row of discharge units 14 and a side edge of object conveyor 11 which faces the row of discharge units 14.

A container conveyor 18, located below an end of the conveying path of belt conveyor 11, preferably extends perpendicularly to belt conveyor 11. Container conveyor 18 feeds containers 17, each of which will house objects discharged by each cycle of retrieval, to a loading position below the end of the conveying path of object conveyor 11.

Figure 4:
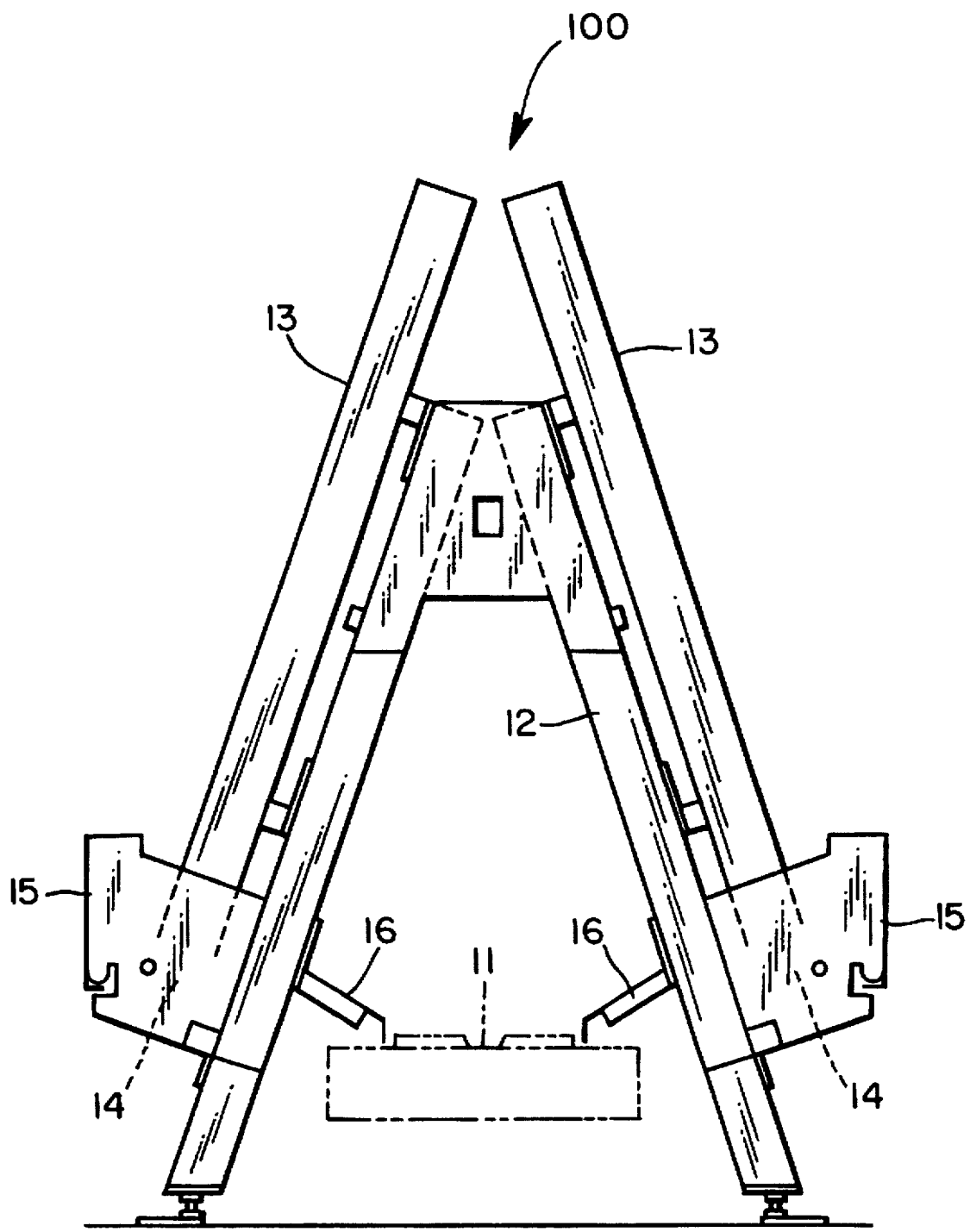
FIG. 4 is a front view of the object picking system of FIG. 1.

Referring to FIG. 4, chutes 16 direct discharged objects A to the center of object conveyor 11 of object picking system 100. Chutes 16 also ensure that objects A do not roll off of or are not pushed off of the sides of object conveyor 11.

Figure 5:
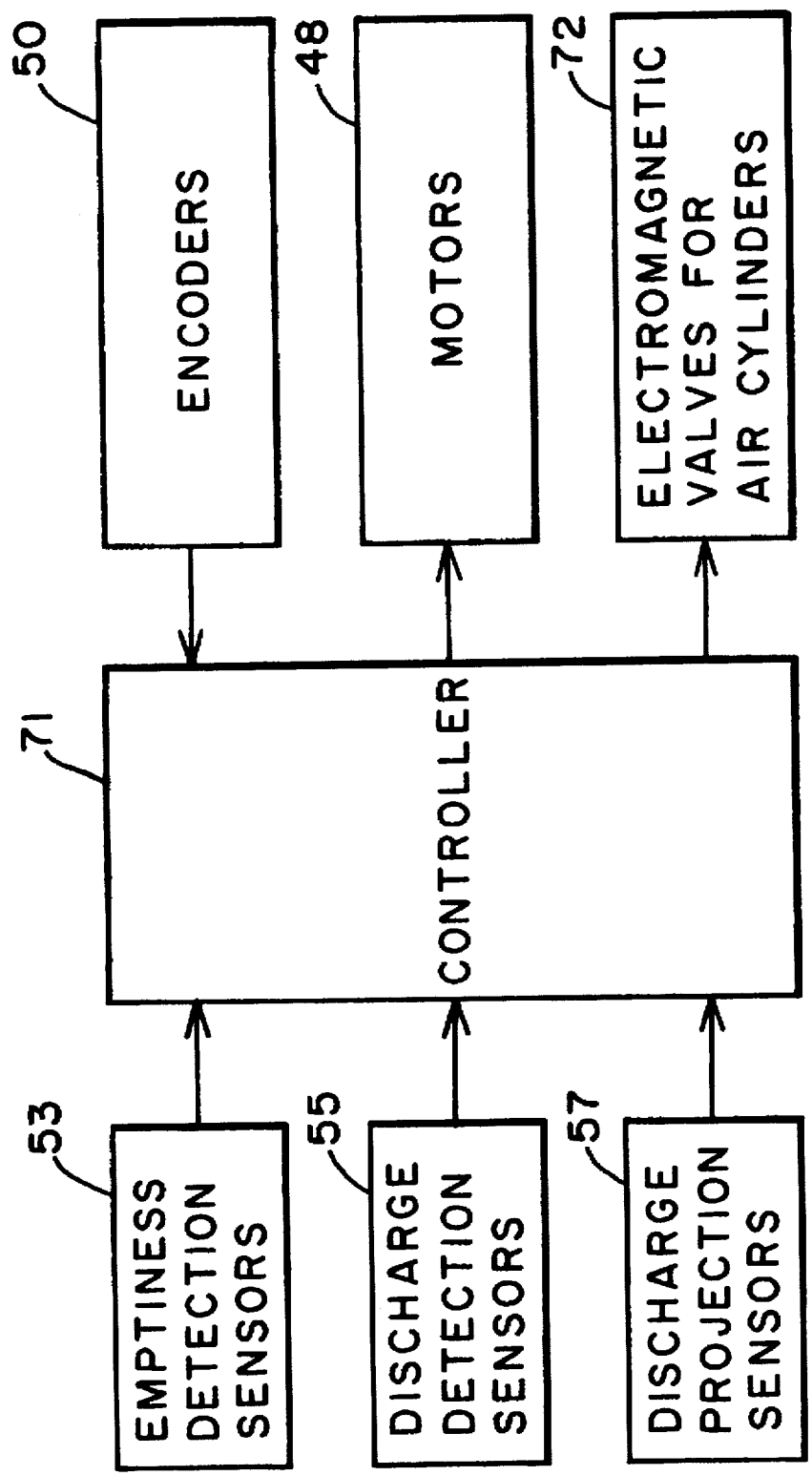
FIG. 5 is a block diagram of the control system of the object picking system of FIG. 1

Referring to FIG. 5, a controller 71 of object picking system 100 receives a signal from emptiness detection sensor 53, discharge detection sensor 55, and discharge projection sensor 57 of each object storage/discharge device 10. An encoder 50 detects the degree of rotation of motor 48 and sends a signal representing the degree of rotation to controller 71 for each object storage/discharge device 10. Controller 71 calculates the degree of rotational movement of timing belt 44 based on the output of encoder 50. Based on signals input from encoder 50, controller 71 determines a current degree of rotation of timing belt 44 and outputs a control signal to motor 48 to rotate timing belt 44 with respect to its standard position, i.e., the position when one of discharge projections 47 of timing belt 44 is in discharge port 23.

Controller 71 also sends a control signal to an electromagnetic valve 72 to control the direction of air flow for air cylinder 62 (FIG. 1). Air cylinder 62 moves lifting member 63 forward or rearward with respect to its initial retracted position.

Figure 6A:
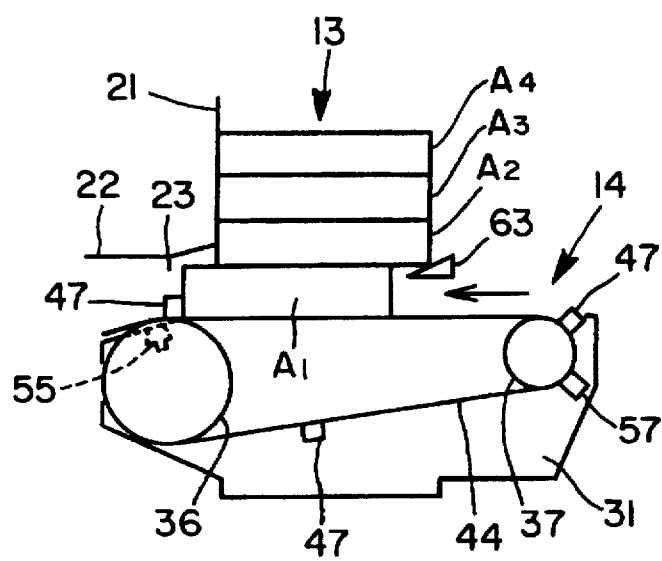
FIG. 6a shows the object discharge device of FIG. 1 at the beginning of a discharge cycle.

Referring to FIG. 6a, in the stand-by state ready to discharge, lifting member 63 is at its initial retracted position. In this state, the bottommost object $A_1$ from among a stack of a plurality of objects A contained in each object storage section 13 contacts load receiving platforms 32, bearing the weight of all other objects A stacked thereon. One of discharge projections 47 of timing belt 44 is at its standard position in the discharge port 23 on the down stream side of object $A_1$, thereby preventing bottommost object $A_1$ from slipping forward out of discharge port 23.

To discharge a bottommost object $A_1$ from object storage/discharge unit 10, air cylinder 62 is actuated to advance lifting member 63 into object storage section 13. Lifting member 63 urges the rear end of next bottommost object $A_2$ forward and upward. Bottommost object $A_1$ is thus relieved of most of the weight of the remainder of objects A. The forward urging tends to wedge the forward end of object $A_2$ against storage frame 21, thereby preventing it from moving downward during subsequent operations.

Figure 6B:
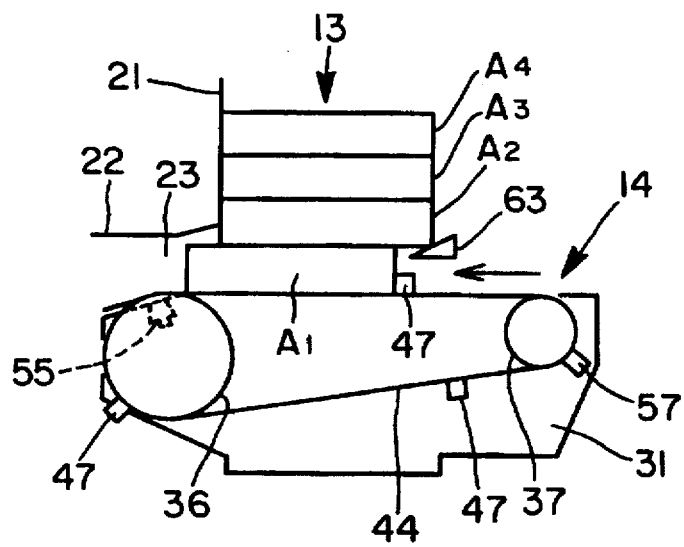
FIG. 6b shows the object discharge device of FIG. 6a beginning to move the bottommost object out of the object storage device.

Referring to FIG. 6b, motor 48 rotates timing belt 44. Discharge projection 47 located upstream from bottommost object $A_1$ with respect to discharge direction F contacts the rear of bottommost object $A_1$.

Figure 6C:
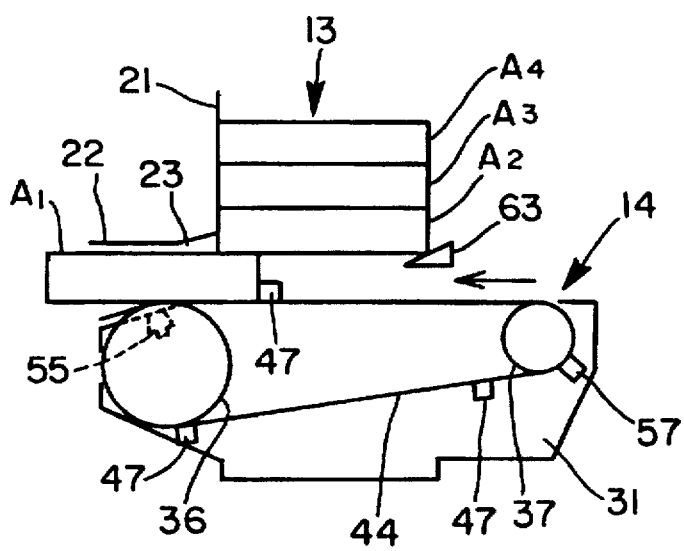
FIG. 6c shows the object discharge device of FIG. 6a when a discharge detection sensor detects the presence of the bottommost object.

Referring to FIG. 6c, discharge projection 47 pushes bottommost object $A_1$ toward discharge port 23. Discharge detection sensor 55 detects bottommost object $A_1$ being pushed towards discharge port 23.

Figure 6D:
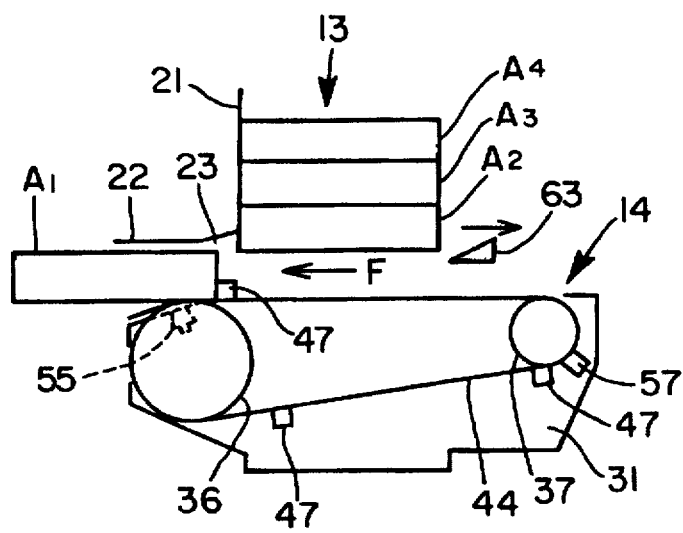
FIG. 6d shows the object discharge device of FIG. 6a with the bottommost object completely discharged and lifting member retracted.

Referring to FIG. 6d, when bottommost object $A_1$ is pushed out of the bottom of object storage section 13 with the next discharge projection 47 not yet reaching its standard position inside discharge port 23, air cylinder 62 retracts lifting member 63. With the forward wedging of lifting member 63 removed, next bottommost object $A_2$ lowers into the position of bottommost object $A_1$.

Figure 6E:
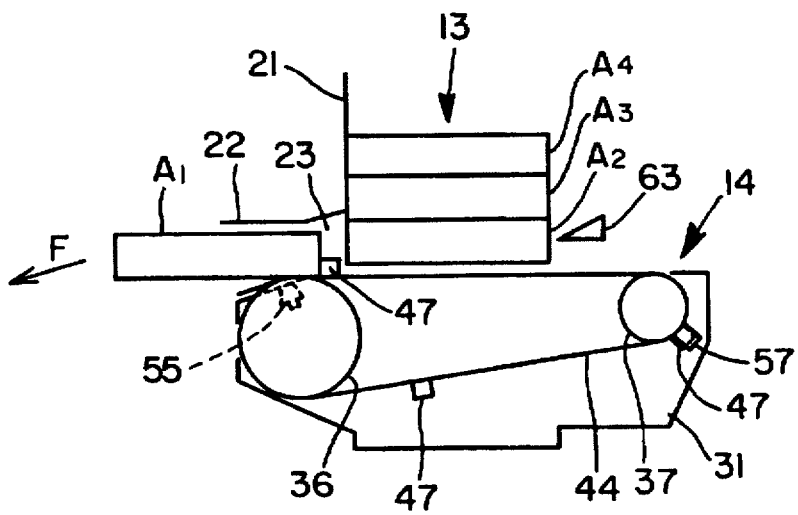
FIG. 6e shows the object discharge device of FIG. 6a when the objects remaining in the stack are lowered after discharge of the bottommost object.

Referring to FIG. 6e, when original bottommost object $A_1$ is pushed out of the bottom of object storage section 13, discharge projection 47 has almost reached the standard position. Discharge projection detection sensor 57 detects the passing of discharge projection 47, thereby enabling the next discharge action.

When only a single one of objects A is to be discharged, or when the last of a series of objects A is discharged, motor 48 halts with discharge projection 47 at its standard position. This returns the system to its stand-by state waiting for the next cycle of object discharge.

Figure 6F:
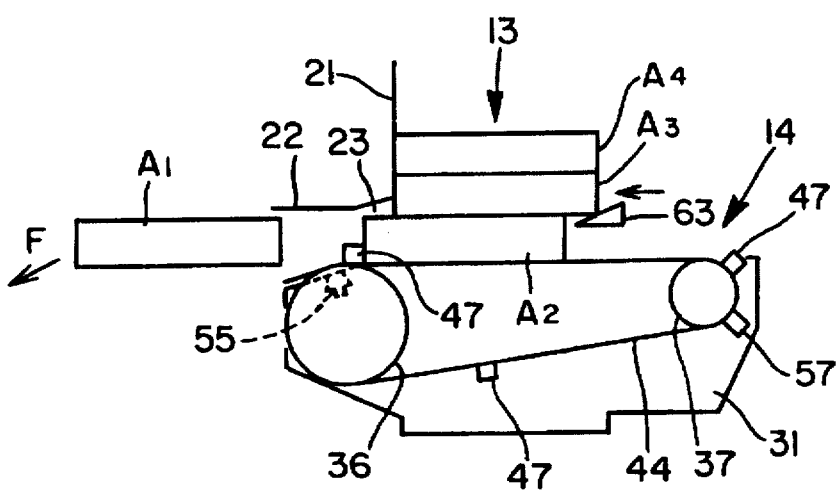
FIG. 6f shows the object discharge device of FIG. 6a at the beginning of a new discharge cycle with a new bottommost object.

Referring to FIG. 6f, when a plurality of objects A are successively discharged, air cylinder 62 is actuated cyclically to advance and retract lifting member 63, thereby raising objects A positioned above bottommost object $A_1$ and to drop the next of objects A onto the position from which it is discharged. Bottommost objects $A_1, A_2, \ldots$ are successively discharged following the same procedure described above, with motor 48 continuously running. After a desired number of objects A are discharged, motor 48 halts with discharge projection 47, which has finished the discharging action, at the standard position inside discharge port 23. This returns the system to the stand-by state waiting for the next cycle of object discharging.

By continuously turning timing belt 44 as described above, objects A are successively discharged at high speed. Furthermore, stopping discharge projection 47 at its standard position inside discharge port 23, prevents objects A from spilling out of discharge port 23 even though load receiving platforms 32 are inclined toward belt conveyor 11. Thus, erroneous retrieval of objects A is prevented.

When discharging an object, as lifting member 63 lifts next bottommost object $A_2$, bottommost object $A_1$ is relieved of the weight of the other objects A stacked thereon. Therefore, not only is bottommost object $A_1$ consistently discharged with a minimal ejection force, but it is also protected from damage such as surface scrapes, peeling of printing from its surface, and tearing of its wrapping.

When discharge projection detection sensor 57 fails to detect the passage of discharge projection 47 at the proper time, controller 71 detects this as an abnormal condition. Furthermore, where discharging detection sensor 55 fails to detect object A or where the presence of object A continues to be detected, controller 71 determines that object A is stuck along the discharge route and alerts the operator.

Figure 7:
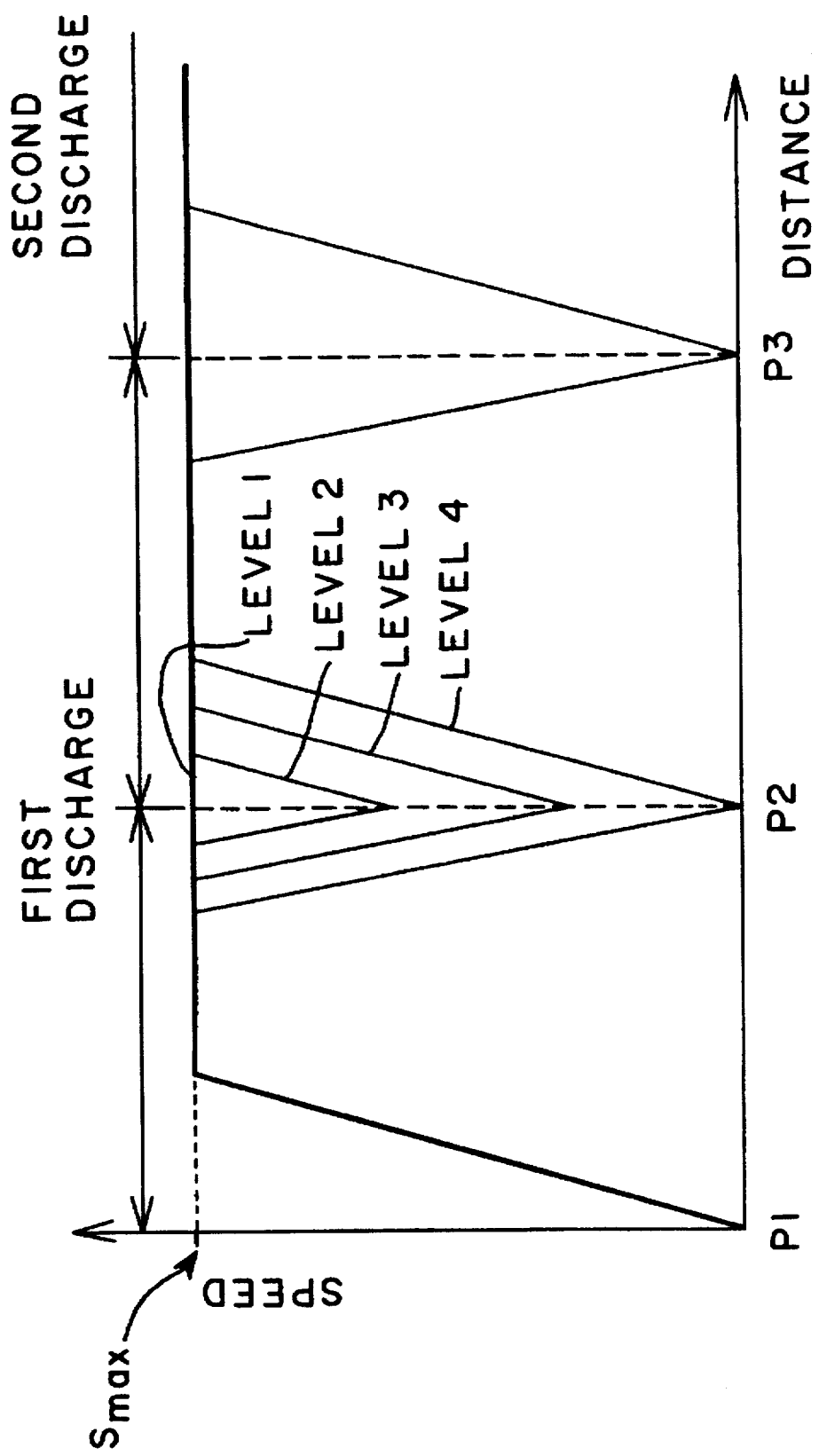
FIG. 7 shows a graph which explains traveling speed of the discharge projections of the discharge mechanism of FIG. 2.

Referring to FIGS. 6a and 7, a traveling speed of discharge projection 47 during the discharge cycle is explained. When timing belt 44 starts revolving at the start of a discharge cycle, the traveling speed of discharge projection 47, which has been at a stand-by point P1 located upstream from object A with respect to discharge direction F, gradually increases and becomes constant at a maximum speed $S_{max}$.

Referring now to FIGS. 6b and 7, at a contact point P2, discharge projection 47 comes into contact with the object to be discharged, speed is controlled according to a fragility of the object to be discharged. The location of contact point P2 mentioned above varies depending on the length of bottommost object $A_1$. In cases where only a single object is to be discharged, discharge projection 47 stops upon reaching standard position P3 in discharge port 23. On the other hand, in case of successive discharge, discharge projection 47 continues to travel at the maximum speed, thereby permitting the second object and the objects thereafter to be discharged.

Referring now also to FIG. 5, controller 71 controls the speed of discharge projection 47 at contact point P2, by controlling motor 48. Objects A are classified beforehand according to their fragility, from level 1 (the lowest fragility level, i.e., not easy to break) to level 4 (the highest fragility level, i.e., the most fragile). When objects A are classified in the level 1 category, they are discharged at the maximum speed $S_{max}$. When objects A are classified as level 2 through 3, the speed of discharge projection 47 is reduced before discharge projection 47 comes into contact with bottommost object $A_1$ at contact point P2, thereby reducing the impact of contact. When objects A are classified in level 4, discharge projection 47 stops for a moment as it reaches contact point P2 to reduce the impact of contact to a minimum.

By controlling the velocity of discharge projection 47 at contact point P2 as described above, fragile objects A are protected from damage during the discharge cycle.

Having described the preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An object discharge device effective for discharging a first object from a stack of at least first and second objects, comprising:

a bottom platform on which said first object rests;

a discharge end of said platform;

means for pushing said first object along said platform from a first position at a bottom of said stack to said discharge end;

said means for pushing including means for varying a speed of said pushing between at least two non-zero speeds dependent upon a predetermined fragility of said objects.

2. The object discharge device of claim 1, further including:

a controller; and said controller including means for controlling said means for pushing and said means for varying a speed.

3. The object discharge device of claim 2, wherein said means for varying a speed includes:

means for maintaining a maximum speed of said means for pushing when said predetermined fragility of said objects is low;

means for slowing said means for pushing at an instant of contact with said first object to a speed below said maximum speed when said predetermined fragility is average; and means for slowing down said means for pushing to a pause at an instant before said contact when said predetermined fragility is high.

4. The object discharge device of claim 2, further including:

an emptiness sensor mounted above said platform;

said emptiness sensor including means for transmitting an empty signal to said controller responsive to an absence of objects in said discharge device; and said means for controlling being responsive to said empty signal.

5. The object discharge device of claim 1, wherein said means for pushing includes:
 a slot in said platform;
 at least one projection, movable along said slot, projecting above said platform; and
 means for moving said at least one projection along said slot in contact with a rear end of said first object.

6. The object discharge device of claim 5, further including:
 a controller; and
 said controller including means for controlling said means for moving said at least one projection and said means for varying a speed.

7. The object discharge device of claim 6, wherein said controller further includes means for determining a position of said at least one projection.

8. The object discharge device of claim 7, wherein:
 said means for moving said at least one projection includes a motor; and
 said means for determining a position of said at least one projection includes means for determining a degree of rotation of said motor.

9. The object discharge device of claim 6, wherein said means for varying a speed includes:
 means for maintaining a maximum speed of said means for pushing when said predetermined fragility of said objects is low;
 means for slowing said means for pushing at an instant of contact with said first object to a speed between zero and said maximum speed when said predetermined fragility is average; and
 means for slowing down said means for pushing to a pause at an instant before said contact when said predetermined fragility is high.

10. The object discharge device of claim 9, further including:
 an object sensor including means for transmitting a first signal to said controller responsive to whether an object is at said discharge end; and
 said means for controlling being responsive to said means for transmitting said first signal.

11. The object discharge device of claim 10, further including:
 a projection sensor mounted below said bottom plate;
 said projection sensor including means for transmitting a second signal to said controller responsive to whether said at least one projection has passed said projection sensor; and
 said means for controlling being responsive to said means for transmitting said second signal.

12. The object discharge device of claim 11, further including:
 an emptiness sensor above said platform;
 said emptiness sensor including means for transmitting an empty signal to said controller responsive to whether said stack of objects contains less than a predetermined amount of objects; and
 said means for controlling being responsive to said empty signal.

13. The object discharge device of claim 9, further including:
 a projection sensor mounted below said bottom plate;
 said projection sensor including means for transmitting a second signal to said controller responsive to whether said at least one projection has passed said projection sensor; and
 said means for controlling being responsive to said means for transmitting said second signal.

14. An object picking device effective for storing a plurality of stacks of at least first and second objects and selectively discharging a first object of said stacks onto an object conveyor, comprising a plurality of object discharge devices, each one of said plurality of object discharge devices including:
 a bottom platform on which said first object of a respective one of said plurality of stacks rests;
 said bottom platform having a longitudinal slot;
 means for pushing said first object along said bottom platform from a first position at a bottom of said respective one of said plurality of stacks to a second position at least partially outside said each one of said plurality of object discharge devices; and
 said means for pushing including means for incrementally adjusting a speed of said pushing between at least two non-zero speeds dependent on a predetermined fragility of said objects.

15. The object picking device of claim 14, wherein each one of said object discharge devices further includes:
 an emptiness sensor mounted above said platform;
 said emptiness sensor including means for transmitting an empty signal to said controller responsive to an absence of objects in each one of said plurality of object discharge devices; and
 said means for controlling being responsive to said empty signal for said each one of said plurality of object discharge devices.

16. The object picking device of claim 14, further including:
 a controller; and
 said controller including means for controlling said means for pushing and said means for incrementally adjusting a speed for each of said plurality of object storage and discharge devices.

17. The object discharge device of claim 16, wherein said means for incrementally adjusting a speed includes:
 means for maintaining a maximum speed of said means for pushing when said predetermined fragility of said objects is low;
 means for slowing said means for pushing at an instant of contact with said first object to a speed between zero and said maximum speed when said predetermined fragility is average; and
 means for slowing down said means for pushing to a pause at an instant before said contact when said predetermined fragility is high.

18. The object picking device of claim 14, wherein said means for pushing includes:
 at least one projection movable along said longitudinal slot projecting above said bottom platform; and
 means for moving said at least one projection along said longitudinal slot in contact with a rear end of said first object.

19. The object picking device of claim 18, further including:
 a controller; and
 said controller including means for controlling said means for moving said at least one projection and said means for incrementally adjusting a speed for said each one of said plurality of object storage and discharge devices.

20. The object discharge device of claim 19, wherein said controller further includes means for determining a position of said at least one projection.

21. The object discharge device of claim 20, wherein:
said means for moving said at least one projection includes a motor; and
said means for determining a position of said at least one projection includes means for determining a degree of rotation of said motor.

22. The object discharge device of claim 19, wherein said means for incrementally adjusting a speed includes:
means for maintaining a maximum speed of said means for pushing when said predetermined fragility of said objects is low;
means for slowing said means for pushing at an instant of contact with said first object to a speed between zero and said maximum speed when said predetermined fragility is average; and
means for slowing down said means for pushing to a pause at an instant before said contact when said predetermined fragility is high.

23. The object picking device of claim 22, wherein each one of said plurality of object discharge devices further includes:
an object sensor including means for transmitting a first signal to said controller responsive to whether an object is at said second position; and
said means for controlling being responsive to said means for transmitting said first signal for said each one of said plurality of object discharge devices.

24. The object picking device of claim 23, wherein each one of said plurality of object discharge devices further includes:
a projection sensor mounted below said bottom plate;
said projection sensor including means for transmitting a second signal to said controller responsive to whether one of said plurality of projections has passed said projection sensor; and
said means for controlling being responsive to said means for transmitting said second signal for said each one of said plurality of object storage and discharge devices.

25. The object picking device of claim 22, wherein each one of said plurality of object discharge devices further includes:
a projection sensor mounted below said bottom plate;
said projection sensor including means for transmitting a second signal to said controller responsive to whether one of said plurality of projections has passed said projection sensor; and
said means for controlling being responsive to said means for transmitting said second signal for said each one of said plurality of object storage and discharge devices.

26. The object picking device of claim 22, wherein each one of said plurality of object discharge devices further includes:
an emptiness sensor above said platform;
said emptiness sensor including means for transmitting an empty signal to said controller responsive to whether said stack of objects contains less than a predetermined amount of objects; and
said means for controlling being responsive to said empty signal for said each one of said plurality of object storage and discharge devices.

27. An object picking system comprising:
a platform;
a stack containing a plurality of objects on said platform;
means for moving a projection into urging contact with a rear of a bottommost of said plurality of objects, thereby urging said bottommost of said objects to a discharge location;
means for varying a speed of initial contact of said projection with said bottommost object between at least two non-zero speeds.

28. The object picking system of claim 27, wherein said means for varying includes means for changing said speed to one of four increments, said one of four increments being from substantially zero for objects having a highest fragility to a maximum speed for those objects having a lowest fragility.

29. An object discharge device, comprising:
a bottom platform;
a vertical stack on said bottom platform of at least a first object on the bottom of said vertical stack and a second object on said first object;
said bottom platform having a slot;
a belt reeved about two pulleys underneath said bottom platform such that at least one portion of said belt runs along said slot;
said belt having at least one projection;
said at least one projection projecting through said slot when said at least one projection is within said at least one portion;
said projection moving into urging contact with said first object at a first position at the bottom of said stack and urging said object to a discharge position at an end of said platform when said belt is rotated about said two pulleys and said projection is moved along said slot;
means for varying a speed of initial contact of said projection with said first object between at least two non-zero speeds.

30. An object discharge device, comprising:
a bottom platform;
a vertical stack on said bottom platform of at least a first object and a second object;
a motor drivingly connected to a pushing projection;
said pushing projection being driven by said motor from a first position at a bottom of said stack to a discharge position at an end of said platform;
said pushing projection moving into urging contact with said first object at said first position and urging said first object to said discharge position when said pushing projection is driven by said motor;
means for varying a speed of said projection at a point of initial contact of said projection with said first object between at least two non-zero speeds.

* * * * *